April 7, 1970 M. S. BAWA ET AL 3,505,018
REFORMING HYDROCARBON FUELS
Filed Oct. 31, 1966

INVENTOR
MOHENDRA S. BAWA
JAMES K. TRUITT
V. Bryan Medlock, Jr.
ATTORNEY

United States Patent Office 3,505,018
Patented Apr. 7, 1970

3,505,018
REFORMING HYDROCARBON FUELS
Mohendra S. Bawa and James K. Truitt, Dallas, Tex.,
assignors to Texas Instruments Incorporated, Dallas,
Tex., a corporation of Delaware
Filed Oct. 31, 1966, Ser. No. 590,813
Int. Cl. C01b 1/16
U.S. Cl. 23—212                                    10 Claims

ABSTRACT OF THE DISCLOSURE

A process for reforming hydrocarbon fuels by admixing a hydrocarbon and water to form a feed stream, contacting the feed stream with an inorganic salt or mixture of inorganic salts in the molten state, and separating the gaseous effluent generated by this contact. More specifically, the process provides a useful method for generating hydrogen by contacting a hydrocarbon or mixture of hydrocarbons with an inorganic salt or mixture of salts at temperatures ranging from about 350° C. to about 850° C. After the hydrogen-containing effluent is removed from the molten salt, the latter may be mixed with oxygen at a temperature and pressure sufficient to permit combustion between the oxygen and any residual carbon which may be retained in the salt, after which the gaseous reaction products of this combustion are removed.

---

Figure 1:
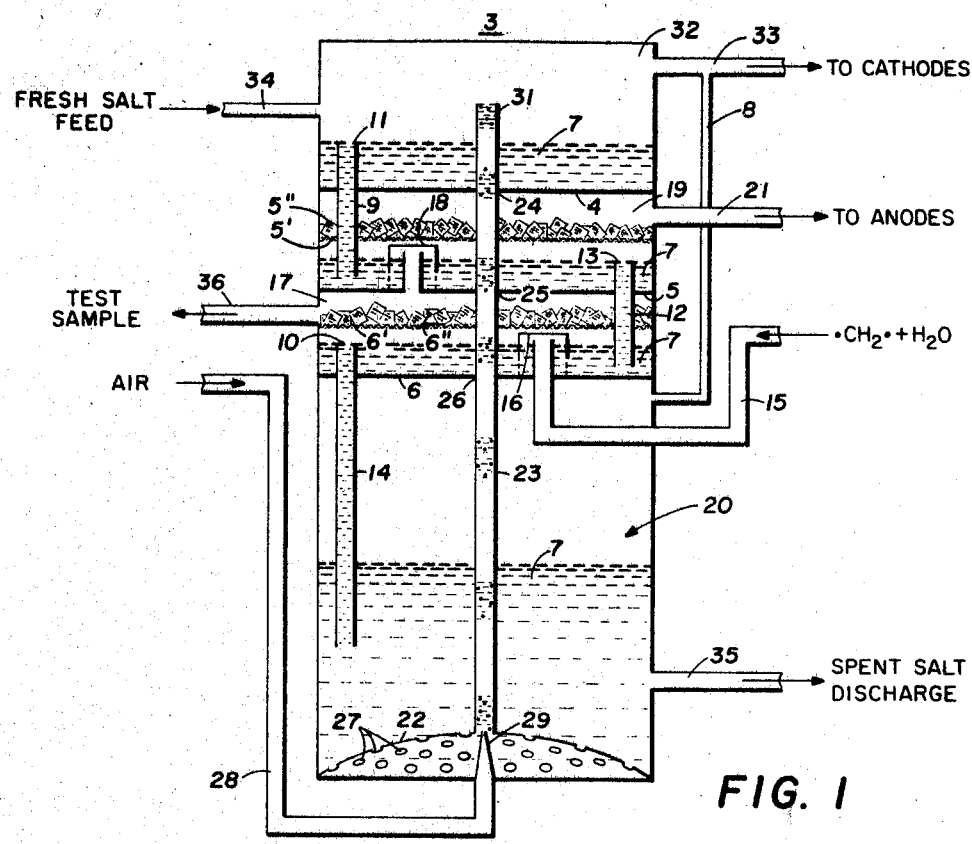

This invention relates to a method and apparatus for producing hydrogen, and more particularly, but not by way of limitation to a method and apparatus for reforming hydrocarbon fuels to produce hydrogen for fuel cells and the like.

Direct conversion of hydrocarbon fuels to electrical energy by various types of fuel cells and fuel cell systems has been proposed by the prior art. While most fuel cells use only pure hydrogen for fuel, there have been developed recently fuel cells capable of using an impure hydrogen stream, such as one having carbon monoxide in addition. However, conversion of hydrocarbon fuels to a suitable impure hydrogen fuel has heretofore involved expensive, bulky and complex equipment. For example, conversion of gaseous hydrocarbons to impure hydrogen may be accomplished by partial oxidation of hydrocarbons. However, careful control of the reaction is required to prevent carbon formation and the reaction must be carried out at temperatures in excess of 1200° C.

Another classic conversion process known as "steam reforming of hydrocarbons" has also been used. In this process steam is reacted with a hydrocarbon fuel to produce molecular hydrogen and carbon monoxide. This reaction, however, is endothermic and has therefore been practiced in the past with the use of a catalyst at temperatures between about 350° C. and 750° C. The catalyst used in such steam reforming reactions have been catalysts such as nickel and nickel alloys which are easily poisoned by impurities such as elemental or combined sulfur which is commonly found in most commercial hydrocarbon fuels.

While the steam reforming of all hydrocarbon fuels is thermodynamically feasible, with high molecular weight alkyl hydrocarbons and olefins, carbon will be deposited in the steam reforming process. The carbon thus produced can build up and render the equipment ineffective.

The present invention provides a method and apparatus to produce hydrogen from a wide variety of hydrocarbon fuels, including high molecular weight alkyl hydrocarbons and olefins without the build-up of elemental carbon. The process and apparatus is particularly useful in producing hydrogen from sulfur containing hydrocarbons without the usual problems of sulfur contamination of catalysts.

The inventive method may generally be described as a method for producing hydrogen for fuel cells from hydrocarbons, comprising the steps of admixing a hydrocarbon fuel and water to form a feed stream. The feed stream is intimately contacted with an inorganic salt between 350° C. and 850° C., and the gaseous effluent generated by the hydrocarbon fuel and water in contact with the liquid inorganic salt is removed from the salt. The molten salt is then, after removal of the effluent therefrom, mixed with oxygen at a temperature and pressure sufficient to permit combustion between the oxygen and any carbon retained in the salt, and the gaseous reaction products of the oxygen and carbon are removed.

Apparatus in accordance with the present invention may be generally described as including a first chamber which is partially filled with liquid or inorganic salt between 350° C. and 850° C. Means are provided for intimately admixing a feed stream of at least one hydrocarbon fuel and water with the liquid salt for producing hydrogen. Means are also provided for removing from the first chamber the hydrogen produced therein and for circulating the salt in the first chamber to a second chamber and for returning the salt from the second chamber back to the first chamber. The salt contained in the second chamber is intimately mixed with oxygen for combusting any carbon retained in the salt, and the combustion product of the carbon and oxygen is removed from the second chamber.

Figure 2:
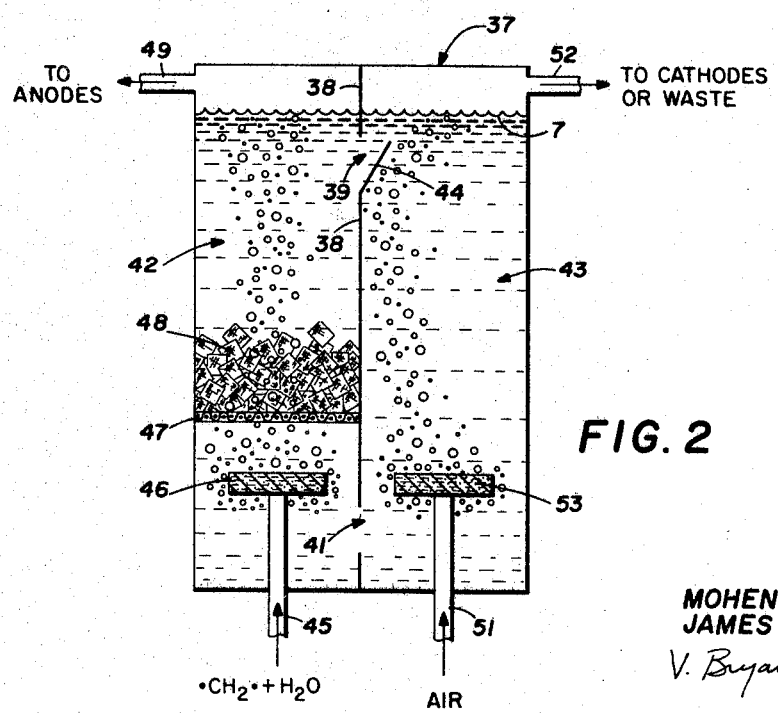

A particular advantage of the inventive method and apparatus is the high efficiency obtained at low temperatures while avoiding poisoning of any catalyst which may be used. Other objects, features and advantages will become apparent after a reading of the following description taken in connection with the drawings, in which:

FIGURE 1 is a pictorial view in vertical section of apparatus embodying the present invention; and FIGURE 2 is also a pictorial view in vertical section of yet another apparatus embodying the present invention.

In FIGURE 1, a vertical container 3, which may be cylindrical, shown in transverse cross section, is provided with a plurality of trays 4–6 all of which support a liquid inorganic salt 7 as does the bottom of the vessel. Salt 7 on tray 4 communicates with the salt 7 on tray 5 through a downspout 9, end 11 of which protrudes above tray 4. Downspout 9 will serve to maintain a constant liquid level above tray 4. Tray 5, in turn, communicates with tray 6 through a downspout 12, end 13 of which protrudes above tray 5 to determine the liquid level above tray 5. Tray 6, in turn, communicates with the bottom of vessel 3 through a downspout 14, end 10 of which extends above tray 6 to determine the liquid level of salt 7 above tray 6. A hydrocarbon fuel and water, preferably in the form of steam, are fed through conduit 15 into the salt 7 on tray 6 through a conventional bubble cap 16 which disperses the material in salt 7 permitting intimate contact therebetween. In the presence of the molten salt which is preferably maintained between 350° C. and 850° C., the hydrocarbon fuel which may generally be identified by the formula $\cdot CH_2 \cdot$ and water will undergo the following reactions:

(1)  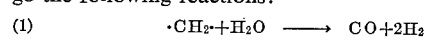

(2)  

The gaseous effluent of CO, $H_2$ and any unreacted hydrocarbon fuel and water from tray 6 will flow through vapor space 17 above tray 6 within which is supported a 100 mesh (Tyler series) nickel screen 6' which supports a plurality of foraminous nickel strips 6'' such as may be formed by cutting squares from a 125 mesh (Tyler series) nickel screen. The nickel serves to catalyze the reformation, and the gaseous effluent after passing through screen 6' and strips 6" will pass through conventional bubble cap 18 on tray 5. Bubble cap 18 disperses the gaseous effluent in the bed of salt 7 on tray 5 to intimately contact the gases and salt to permit further reformation of the hydrocarbon fuel. The gaseous effluent from salt 7 on tray 5 will exit the vapor space 19 above tray 5, within which are supported a nickel screen 5' and nickel strips 5", through conduit 21 which may be communicated with the anode of a conventional hydrogen fuel cell such as those described in "Electrode Processes in Molten Carbonate Fuel Cells," Advances in Chemistry Series, No. 47, page 232, published by the American Chemical Society, Washington, D.C. (1965). The nickel screen 5' and strips 5" serve to further catalyze the reforming of the feed stream. Salt 7 which may be molten inorganic salt such as carbonates of sodium, potassium, or lithium or mixtures thereof or mixtures of such carbonate salts with sulfate salts of sodium, potassium or lithium serve as a heat transfer agent to improve efficiency of the steam reforming of hydrocarbon fuel and also serves as an aid in cracking any aromatic and branched chain hydrocarbons in the feed stream to make them more suitable for the reforming reaction. Furthermore, the molten salt further serves to remove sulfur and lead compounds from the hydrocarbon fuel to prevent contamination of the gas exiting to the anode of a fuel cell. The sulfur impurities which may be generally represented by the formula $\cdot S \cdot$ is believed to undergo the following reactions in the presence of a carbonate salt:

(3) $\quad \cdot S \cdot + CO_3^= \rightarrow SO_3^= + CO_2$

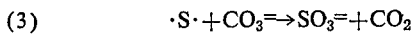

The sulfite thus produced will undergo further reaction, as will be explained later. The reaction by which other inorganic salts entrain the sulfur contaminants is not understood, but they are effective nonetheless. Salt 7 on tray 5 and tray 6, which will contain any carbon formed during the reforming of the hydrocarbon fuel, as well as any sulfur contaminant in the fuel will, as explained before, flow through downspouts 12 and 14 into bottom 20 of container 3. Bottom 20 of container 3 is provided with a foraminous truncated spherical-shaped shell 22 having an integral conduit 23 which rises through trays 4–6. Conduit 23 is sealingly affixed to trays 4–6 at points 24–26, respectively. The carbon and sulfur laden salt 7 contained in the bottom 20 of container 3 will enter shell 22 through the apertures 27 and be lifted through conduit 23 by air introduced into container 3 through conduit 28. Air in conduit 28 discharges through nozzle 29 proximate the bottom end of conduit 23 to serve as a lifting agent for salt 7. To assure that pressure in the vapor space of bottom 20 does not force salt through conduit 23, there is provided a pressure equalization conduit 8 which communicates bottom 20 and vapor space 32 above tray 4. Nozzle 29 disperses the air within the salt to intimately mix the salt and air. The air, which serves as an economical source of oxygen, reacts with the entrained carbon by the following reaction:

(4) $\quad C + O_2 + 4N_2 \rightarrow CO_2 + 4N_2$

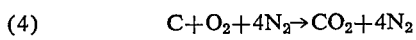

The sulfite retained by the salt 7 is believed to undergo the following reaction in the presence of the air:

(5) $\quad SO_3^= + O_2 + 4N_2 \rightarrow SO_4^= + 4N_2$

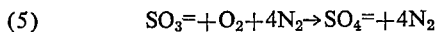

The gaseous byproducts of the combustion between the entrained carbon and oxygen in the air stream will exit the top 31 of conduit 23 into vapor space 32 above tray 4 from which it flows through conduit 33 to the cathode of a conventional fuel cell, such as those described in the article "Electrode Processes in Molten Carbonate Fuel Cells," cited above, or to a waste stream. Salt 7 exiting top 31 of conduit 23 will flow through downspout 11 onto tray 6 to provide a carbon-free salt on the reformer trays 5 and 6.

Since the sulfur contained in salt 7 will gradually build up as entrained sulfates, the container 3 preferably has fresh salt feed conduit 34 through which fresh salt may be fed and a spent salt discharge conduit 35 through which salt may be removed to prevent build-up within container 3. The amount of salt to be fed to container 3 to prevent build up of sulfates in the salt 7 will depend upon the degree of sulfur content of the hydrocarbon fuel utilized. The salt may be replaced periodically or continuously. Vapor space 17 above tray 6 preferably communicates through a conduit 36 with means for periodically testing the degree of reforming of hydrocarbon fuel.

In FIGURE 2, another embodiment of apparatus for carrying out the method of the present invention is illustrated. With reference to FIGURE 2, a vertical cylindrical container 37, which like container 3 may be circular in transverse cross section, is provided with a substantially vertical partition 38 having a top opening 39 positioned proximate but below the surface of inorganic molten salt 7 which partially fills container 37. Partition 38 is also provided with an opening 41 proximate the bottom thereof and serves to divide the container 37 into a first chamber 42 and a second chamber 43. Partition 38 is provided with an oblique lip 44 proximate the top opening 39, the purpose of which will be described hereafter. A hydrocarbon fuel and steam feed stream is introduced through conduit 45 and dispersed by a sintered nickel foraminous nozzle 46 to permit intimate contact between the feed stream and the salt 7 in chamber 42. There may be provided, to assure complete reforming of the hydrocarbon stream a catalyst supported on a nickel screen secured across first chamber 42 by any suitable means (not illustrated). The catalyst supported by nickel screen 47 may take the form of a plurality of foraminous nickel strips such as may be formed by cutting a 125 mesh (Tyler series) screen into one-half inch square sections. The screen 47 and sections 48 may be formed of any conventional catalyst such as nickel alloys or chrome steel, as well as nickel. The gaseous effluent from the reformed hydrocarbon, namely CO and $H_2$ will exit chamber 42 through conduit 49 which may direct it to the anodes of a fuel cell such as mentioned in "Electrode Processes in Molten Carbonate Fuel Cells," cited above. Carbon deposited in the molten salt 7 during the reformation of the hydrocarbon fuel will be burned by air entering chamber 43 through conduit 51 and be dispersed through salt 7 by a foraminous nozzle 53 of stainless steel, and any sulfur containing compounds entrained in molten salt 7 will be converted to sulfates in the same manner as the conversion preceded in reactions (3) and (5) above. The combustion product of the carbon and oxygen in the air will exit chamber 43 through conduit 52 to the cathodes of a fuel cell or may be exhausted to the atmosphere. The baffle 44, described above, aids in preventing the flow of gas from chamber 43 into chamber 42 to avoid contamination of the anode stream. The salt 7 in chamber 37 may be periodically replaced through feed and exhaust lines (not illustrated).

Various inorganic salts, such as those mentioned above, may be utilized, it only being necessary that they be molten between 350° C. and 850° C. and provide a suitable heat transfer agent to assist in the reforming of hydrocarbon fuels. It is also preferable that the steam introduced to the hydrocarbon fuel feed be maintained between 350° C. and 850° C. and preferably take the form of a super-heated steam at atmospheric pressure. It is also preferable that approximately 1–2 moles of water be added to the hydrocarbon fuel stream for each carbon atom in the hydrocarbon fuel to maximum reforming of the hydrocarbon fuel.

The salt preferably used is sodium-lithium carbonate (NaLiCO₃).

Various hydrocarbon fuels may be amployed with the present invention, including kerosine, JP–4, CITE Fuel, leaded gasoline, diesel fuel, No. 2 fuel oil, ethane, propane, butane, and straight chain liquid alkyl hydrocarbons, as well as olefins. A catalyst may be used in either of the embodiments illustrated in FIGURE 1 or 2, since the sulfur contaminants which may be charged to either of the units through the hydrocarbon fuel stream will be converted to sulfates which are not contaminants for the nickel, nickel alloys, or chrome steel conventional catalyst.

The exact reaction by which the salts mentioned above remove lead is not known, but it is believed that lead salts are formed which will be retained within the salt 7. While the invention has been described in connection with producing hydrogen for fuel cells, it may also be used in producing hydrogen for general purposes, including the synthesis of ammonia and methanol. Also, while the embodiment of FIGURE 1 utilizes two reforming trays, more or less may be used depending upon the kinetics of the system.

While various terms have been used to describe illustrative embodiments of the apparatus, as well as embodiments of the method of the present invention, they are not intended, nor should they be construed, as limitation on the invention as defined by the claims.

What is claimed is:

1. A method of producing hydrogen from hydrocarbons in the presence of a reforming catalyst, including the steps of:
   admixing a hydrocarbon fuel and water to form a feed stream;
   intimately contacting the feed stream with a liquid inorganic salt between about 350° C. and about 850° C. to produce reaction products containing carbon and a gaseous hydrogen-containing effluent;
   removing the gaseous hydrogen-containing effluent from said liquid salt;
   intimately contacting the molten salt after removal of the effluent therefrom with oxygen at a temperature and pressure sufficient to permit combustion between the oxygen and carbon in said salt; and
   removing the gaseous reaction product of said oxygen and said carbon.

2. The method of claim 1, wherein said hydrocarbon fuel contains lead and additional quantities of said salt are added to the reaction system to prevent buildup of sulfur-containing compounds thereon.

3. The method of claim 1, wherein: said feed stream contacts said salt in a first chamber and said salt is conveyed to a second chamber where said oxygen is intimately mixed therewith.

4. The method of claim 3, wherein said hydrocarbon fuel contains sulfur and said salt is at least periodically reconstituted to prevent build-up of sulfur-containing compounds therein.

5. The method of claim 4, wherein said salt is selected from the group consisting of: sodium carbonate, lithium carbonate, potassium carbonate, and mixtures thereof and mixtures of said carbonates with sodium sulfate, lithium sulfate, potassium sulfate and mixtures thereof.

6. The method of claim 1, wherein said salt is selected from the group consisting of: sodium carbonate, lithium carbonate, potassium carbonate, and mixtures thereof and mixtures of said carbonates with sodium sulfate, lithium sulfate, potassium sulfate and mixtures thereof.

7. The method of claim 1, wherein said salt is $NaLiCO_3$.

8. In the method of reforming a carbonaceous fuel in the presence of a reforming catalyst by intimately contacting a feed stream of water and carbonaceous fuel with a molten inorganic salt to produce products containing carbon and hydrogen, the improvement comprising the step of:
   intimately contacting the liquid inorganic salt with oxygen at a temperature and pressure sufficient to permit combustion between the oxygen and carbon in said salt.

9. The method of claim 8, wherein said hydrogen is produced in a first chamber and said salt is transported to a second chamber for contact with said oxygen.

10. A process of reforming hydrocarbons comprising:
    (a) admixing at least one hydrocarbon compound and water,
    (b) contacting said hydrocarbon compound and water in the presence of a reforming catalyst with at least one molten inorganic salt to produce reaction products containing carbon and a gaseous effluent,
    (c) separating said gaseous effluent from said molten inorganic salt,
    (d) said gaseous effluent contains hydrogen, and
    (e) said molten inorganic salt is contacted with oxygen at a temperature and pressure sufficient to allow combustion between the oxygen and carbon in said salt.

References Cited

UNITED STATES PATENTS

| | | | |
|---|---|---|---|
| 292,742 | 7/1943 | Beck et al. | 23—1 |
| 393,258 | 7/1943 | Beck et al. | 23—1 |
| 1,592,860 | 7/1926 | Leonarz | 23—204 |
| 2,513,022 | 6/1950 | Helmers et al. | 23—212 |
| 2,716,053 | 8/1955 | Mayland | 23—204 |
| 3,027,238 | 3/1962 | Watkins | 23—212 |
| 3,106,457 | 10/1963 | Lockerbie et al. | 23—212 |
| 3,147,080 | 9/1964 | Jahnig | 23—212 |
| 3,436,358 | 4/1969 | Thygesen | 23—212 XR |

EDWARD STERN, Primary Examiner

U.S. Cl. X.R.

23—150, 204, 284, 288; 252—373